Patented June 30, 1942

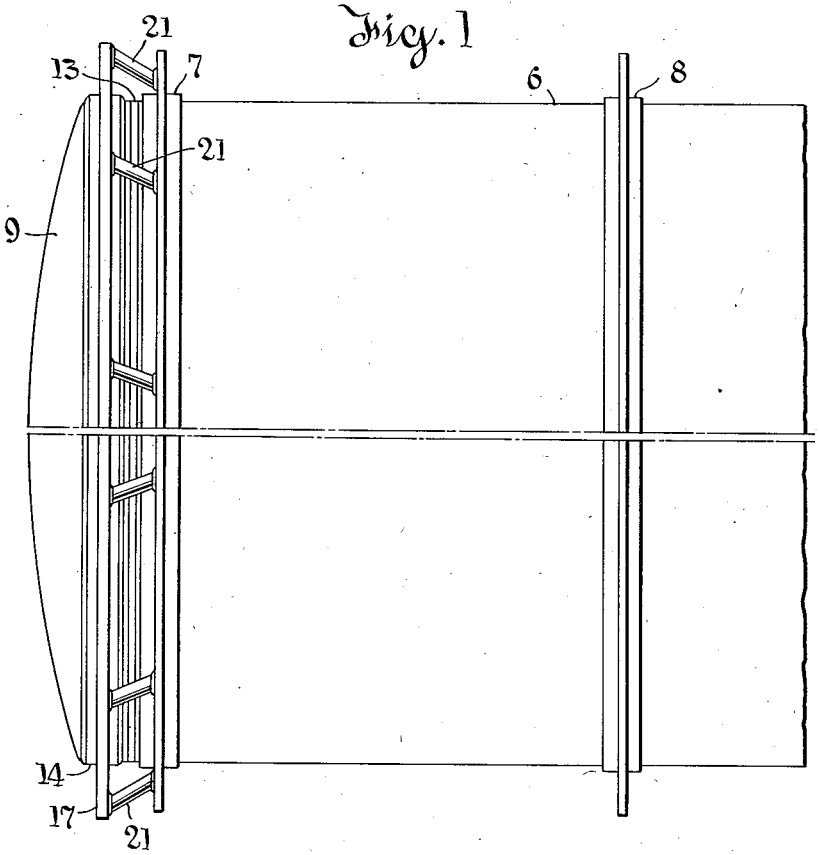
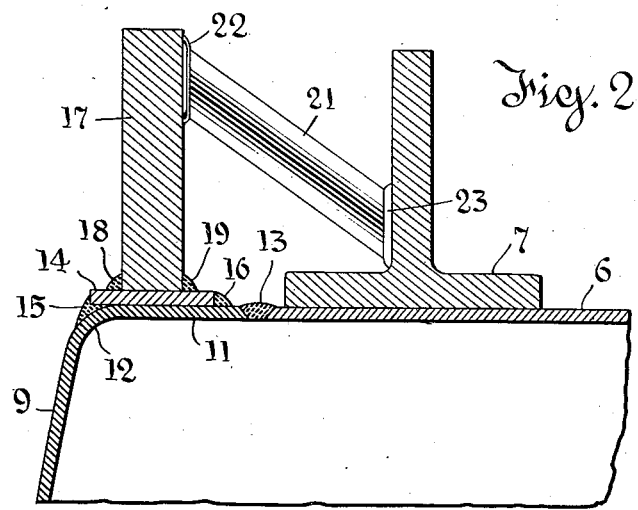

2,287,869

UNITED STATES PATENT OFFICE 2,287,869

PRESSURE TANK FOR MILK

Herbert H. Ehrman, Canton, Ohio, assignor to York Ice Machinery Corporation, York, Pa., a corporation of Delaware Application July 5, 1939, Serial No. 282,884

3 Claims. (Cl. 220—71)

This invention relates to welded sheet metal tanks and particularly to the connection and bracing of the margins of dished heads in large cylindrical pressure tanks constructed of thin gauge material.

In the dairy industry, stainless steel tanks are used. The tanks are large, a seven thousand (7000) gallon tank being ten feet in diameter and over eleven feet long. Alloy steels are expensive, but have good physical properties, so that comparatively thin gauge sheets may be used and substantial economies effected if the tank be adequately braced against distortion. A tank of the size mentioned can be made of sheet approximately 5/64 inch in thickness, provided it be properly sustained.

It is simple, and is known practice, to use circumferential hoops which in a tank of the suggested size would be spaced at about 26-inch intervals. The problem, however, arises as to the dished head. A moderate dish, say, about eight inches (8") is desirable, but is not stable under internal pressure.

The problem is aggravated where, as in the dairy industry, a smooth interior is an important requirement, for this requires a butt weld between the head flange and the cylindrical shell and this weld must be ground smooth and polished on the inside of the tank. Such a weld offers no reinforcement and in fact tends to introduce a line of weakness at a point where distortion of the head tends to develop a bending moment.

The purpose of the present invention is to provide a simple construction by which the flange of the head can be braced adequately against the bending moments developed in the head by internal pressures. Any web or ring which would adequately sustain the flange of the head would have to be of a substantial thickness and it is impracticable to weld such a ring to the flange, because the flange would be damaged or even burned through in the welding operation.

Accordingly, the procedure is to weld a hoop about the flange, the hoop being approximately the same thickness as the flange. The ring is welded to the hoop. The procedure is such that the welds are made between metal portions near enough the same thickness to avoid the burning effects encountered where one element is thick and the other is relatively thin.

A further feature of the invention is the provision of diagonal braces between the bracing hoop and one of the encircling hoops on the body of the tank. This permits the hoop to be constructed of lighter material than would otherwise be serviceable and thus reduces the disparity in thickness between the hoop and the ring to which it is welded.

A typical embodiment of the invention is illustrated in the accompanying drawing in which:

Figure 1 is a side elevation of a cylindrical tank mounted in horizontal position. A portion is broken away to reduce the apparent diameter in the view.

Figure 2 is a fragmentary section of the joint and bracing structure above-mentioned, drawn approximately full size.

In the drawing, 6 represents one end of the cylindrical shell of the tank. This is made of stainless steel in one or more portions, depending on the size of stock available. There is at least one longitudinal welded seam.

Encircling the shell 6 are a number of hoops or stays of T-section. One of these, indicated by the numeral 7, is near the end of the cylindrical shell, and consequently near the joint between the shell and the head, hereinafter described. The second of these hoops or stays, visible in Figure 1 and indicated by the numeral 8, is spaced from the hoop 7, say, twenty-six (26) inches or there-about, the spacing being a function of the size of the tank, the nature of the contained liquid and other factors as will be readily appreciated.

The head of the tank is a stamping 9 of stainless steel. In thickness it is of the order of 5/64 inch and in this dimension conforms to the shell 6. The head 8 is dished as indicated in Figure 1, the depth of the dish being of the order of eight inches in a tank ten feet in diameter. Obviously, this head is so nearly flat that it is not inherently stable.

The head 9 has a peripheral flange 11 formed integrally with the head and merging into the dished portion of the head through a curve or knuckle indicated at 12. While it is desirable that the knuckle be of long radius, say, 6% of the head diameter, equipment to dish thin sheets with long-radius knuckles is not commercially available and consequently, for commercial reasons, the radius of the knuckle 12 must be made less than one inch. It is this short radius knuckle which is the source of much difficulty in forming tanks of the type here under discussion.

The weld between the flange 11 and the cylindrical portion 6 of the tank is indicated at 13. It is a butt weld and may be formed in any known manner. In any event, the weld must be ground off flush on the inner side of the tank and polished, as clearly indicated in Figure 2.

The finish requirements for the interior of milk tanks are extremely high,—all pin holes and cracks must be filled and ground off flush. This grinding and polishing has a tendency to impair the strength of the joint, particularly where the dished head tends to develop a bending moment localized in the joint.

Encircling the flange 11 is a doubler strip or hoop 14 of a thickness which approximates that the flange 11. Encircling the doubler strip 14 is a comparatively heavy ring 17 which may be of ordinary steel. The preferred, but not the only possible procedure within the scope of the invention is to fit the hoop 14 to the flange 11, and fit the ring to the hoop, after which the hoop and the ring are removed from the flange and tack welded together. After they have been tack welded so they can readily be handled as a unit, they are replaced on the flange 11, drawn to position by clamps and the hoop is hammered to close any cracks that may be detected between it and the flange 11.

After the hoop 14 has been put in position, it is welded to the flange 11 as indicated at 15 and 16. Then, the ring is welded to the hoop 14 at 18 and 19.

In the best construction, the welds 15, 16, 18 and 19 are continuous, but this is not strictly necessary. One labor-saving expedient which may be used where the tank is not subject to substantial internal pressure, is to make the welds 15 and 18 continuous, for (say) the lower three-fourths (¾) of the circumference of the head, tack welds spaced three (3) inches on centers being used on the remaining or top one-fourth (¼) portion of the circumference of the head. The welds 16 and 19 are then made continuous for a substantial interval at each side of the tank, tack welds spaced three (3) inches being used across the top and across the bottom. The point is mentioned, not because any patentable novelty is claimed for making the welds continuous or discontinuous, but to make it clear that the invention is not strictly limited to continuous welds, and that under some conditions, economy dictates the use of tack welding at certain points.

The ring 17, alone, would be adequate to sustain any bursting stress on the flange 11, but it must be remembered that the stress to be resisted is a bending moment delivered through the flange as a result of outward displacement of the dished head under internal pressure. To resist this, the stability of the ring 17 is augmented by a series of diagonal stays 21, each of which is welded at 22 to the ring 17 near the outer margin thereof and is welded at 23 to the hoop 7 near the root of the flange thereof.

In this way, the ring 17 is adequately stayed by means which transfers any distorting load from the flange 11 directly to the hoop 7 mounted on the cylindrical portion 6 of the shell.

Since the hoop 7 has a wide bearing on the shell 6, it is a relatively simple matter to produce a structure which will resist any bending stresses developed in the head flange.

The invention produces a simple and economical way of constructing a large tank of thin gauge material flush on its interior and adequately braced against head stresses, even where the head approximates a flat form.

While the dimensions of the tank embodying the invention have been set forth with some particularity, these dimensions are given merely to explain the importance of the problem and without any implied limiting effect as to the scope of the invention. Generally stated, the problem is present in any tank of substantial size constructed of thin material and particularly tanks of the type in which fluid is stored under pressure.

The exact order of welding may be varied as above suggested, but one alternative procedure should be mentioned. Instead of tack welding the hoop and the ring together and then applying them to the flange as a unit, it is practicable to mount the hoop 14 on the flange, hammer the hoop to produce the necessary close fit and weld the hoop at 15 and 16. Then the ring 17 may be fitted over the hoop and welded at 18 and 19. In either case, the really heavy welding operations at 18 and 19 are performed when the hoop 14 is in contact with the flange 11 so there is not great disparity between the thicknesses of the two bodies of metal being welded. Where there is great disparity, there is a tendency to burn through the thinner metal.

In tack welding the ring 17 to the hoop 14 preparatory to mounting the two as a unit, the welds are small and the difficulty is not encountered, or at any rate, not to the objectionable extent that would characterize the final welding operation.

What is claimed is:

1. A metal tank comprising in combination a thin metal cylindrical shell; a thin metal flanged head connected with said shell by a butt weld between flange and shell; a doubler strip encircling said flange and welded thereto; a comparatively massive ring encircling said strip and welded thereto; and means encircling and sustained by said shell and connected with said ring to brace the ring against deflection in the general direction of the axis of the cylindrical shell.

2. A metal tank comprising in combination a thin metal cylindrical shell; a thin metal flanged head connected with said shell by a butt weld between flange and shell; a doubler strip encircling said flange and welded thereto; a comparatively massive ring encircling said strip and welded thereto; a hoop encircling and engaging said cylindrical shell; and a series of braces rigidly connecting said ring and hoop.

3. A metal tank comprising in combination a thin metal cylindrical shell; a thin metal flanged head connected with said shell by a butt weld between flange and shell; a doubler strip encircling said flange and welded thereto; a comparatively massive ring encircling said strip and welded thereto; and a staying structure encircling and reacting against said shell and connected with said ring near the outer margin thereof.

HERBERT H. EHRMAN.